US009670895B2

(12) United States Patent
Vogelbacher

(10) Patent No.: US 9,670,895 B2
(45) Date of Patent: Jun. 6, 2017

(54) CONTROL DEVICE FOR A VEHICLE

(71) Applicant: MAGNA ELECTRONICS INC., Auburn Hills, MI (US)

(72) Inventor: Michael Vogelbacher, Albbruck (DE)

(73) Assignee: MAGNA ELECTRONICS, INC., Auburn Hills, MI (US)

( * ) Notice: Subject to any disclaimer, the term of this patent is extended or adjusted under 35 U.S.C. 154(b) by 1067 days.

(21) Appl. No.: 13/887,724

(22) Filed: May 6, 2013

(65) Prior Publication Data

US 2013/0298866 A1 Nov. 14, 2013

Related U.S. Application Data

(60) Provisional application No. 61/806,673, filed on Mar. 29, 2013, provisional application No. 61/793,614, filed on Mar. 15, 2013, provisional application No. 61/643,569, filed on May 7, 2012.

(51) Int. Cl.
*H02H 5/04* (2006.01)
*F02P 19/02* (2006.01)

(52) U.S. Cl.
CPC ............ *F02P 19/02* (2013.01); *F02P 19/023* (2013.01); *F02P 19/027* (2013.01)

(58) Field of Classification Search
CPC ................................ H02H 5/04; H02H 5/047
USPC ........................................................ 361/103
See application file for complete search history.

(56) References Cited

U.S. PATENT DOCUMENTS

| | | | | |
|---|---|---|---|---|
| 5,612,662 | A | 3/1997 | Drekmeier et al. | |
| 5,896,080 | A | 4/1999 | Chen | |
| 6,175,480 | B1 | 1/2001 | Karmazyn | |
| 2009/0127249 | A1 * | 5/2009 | Bauer .................. | F02P 19/027 219/494 |
| 2014/0355162 | A1 | 12/2014 | Biegert | |

FOREIGN PATENT DOCUMENTS

| | | |
|---|---|---|
| DE | 2058357 | 11/1970 |
| DE | 7520602 | 10/1975 |
| DE | 3930819 | 3/1991 |
| DE | 4219554 | 12/1993 |
| DE | 4437122 | 4/1996 |
| DE | 19639427 | 3/1997 |
| DE | 19647035 | 11/1997 |
| DE | 10044081 | 4/2002 |
| DE | 10102235 | 8/2002 |
| DE | 102004014660 | 7/2005 |

(Continued)

*Primary Examiner* — Dharti Patel

(74) *Attorney, Agent, or Firm* — Gardner, Linn, Burkhart & Flory, LLP

(57) ABSTRACT

A control device suitable for use in a vehicle (such as, for example, for a glow plug of a vehicle) includes an electrically conductive element having a first end in electrical connection with a first solder joint and a second end in electrical connection with a second solder joint. A center region of the electrically conductive element is in electrical connection with a vehicle power source. When a temperature at the first solder joint exceeds a threshold temperature and a temperature at the second solder joint is below the threshold temperature, electrical connection at the first solder joint is broken and electrical connection at the second solder joint is not broken.

19 Claims, 10 Drawing Sheets

87 positive over EDC main relays
31 ground
ST control signal from EDC
DI diagnosis signal to EDC
30 positive direct
G1-4 one glow plug each

(56) References Cited

FOREIGN PATENT DOCUMENTS

| | | |
|---|---|---|
| DE | 102005005549 | 8/2006 |
| DE | 102005014601 | 10/2006 |
| DE | 102006026406 | 12/2007 |
| DE | 102007035899 | 2/2009 |
| DE | 102008011226 | 8/2009 |
| DE | 102008057166 | 5/2010 |
| DE | 102008053182 | 7/2010 |
| DE | 102009036578 | 9/2010 |
| DE | 102011118724 | 5/2013 |
| EP | 1334505 | 8/2003 |
| EP | 1467603 | 10/2004 |
| EP | 1560242 | 8/2005 |
| EP | 2485355 | 8/2012 |
| FR | 2978324 | 1/2013 |
| WO | WO2004002202 | 12/2003 |
| WO | WO2010112389 | 10/2012 |

* cited by examiner 87 positive over EDC main relays
31 ground
ST control signal from EDC
DI diagnosis signal to EDC
30 positive direct
G1-4 one glow plug each 87 positive over EDC main relays
31 ground
ST control signal from EDC
DI diagnosis signal to EDC
30 positive direct
G1-4 one glow plug each

CONTROL DEVICE FOR A VEHICLE

CROSS REFERENCE TO RELATED APPLICATIONS

The present application claims the filing benefit of U.S. provisional applications, Ser. No. 61/806,673, filed Mar. 29, 2013; Ser. 61/793,614, filed Mar. 15, 2013; and Ser. No. 61/643,569, filed May 7, 2012, which are all hereby incorporated herein by reference in their entireties.

FIELD OF THE INVENTION

The present invention relates to control devices and, more particularly, to controls or control devices for controlling glow plugs for diesel engines.

BACKGROUND OF THE INVENTION

Glow plugs are known and are used to pre-heat diesel combustion engine cylinders before starting the engine, particularly when the diesel engine is cold. Devices for glow plug control devices are widely known in automotive applications. The controllers typically switch and control the current through glow plugs. The switched/controlled currents are comparably high. In cases where the metal-oxide-semiconductor field-effect transistors (MOS-FETs) become defective, there is the hazard that the glow plug current flow may not become turned off, and may continue to heat, which may lead to damage to the glow plug due to overheating or may lead to defects/slewing of power cables or discharged batteries.

To have a redundant instance to the MOS-FETs, fuses in the line of power are often implemented. Typically, one time fuses use bi-metals or the like and might be known but uncommon for that job. Solutions are known where the main power line becomes broke by one single fuse. Other solutions show power line bundles or one single fuse for each power line, which typically equates to the number of the cylinders of the engine.

SUMMARY OF THE INVENTION

The present invention provides a control device or control with single protected power nodes via tension loaded spring contacts with a source node in the middle or center region of the spring.

According to an aspect of the present invention, a glow plug control device for a diesel engine includes first and second transistors and an electrically conductive spring breaker having a first end in electrical connection with the first transistor via a first solder joint and a second end in electrical connection with the second transistor via a second solder joint. A center region of the electrically conductive spring breaker is in electrical connection with a power source. When a temperature at the first transistor at the first end of the electrically conductive spring breaker exceeds a threshold temperature and a temperature at the second transistor at the second end of the electrically conductive spring breaker is below the threshold temperature, electrical connection between the first end of said electrically conductive spring breaker and the first transistor is broken and electrical connection between the second end of said electrically conductive spring breaker and the second transistor is not broken.

Thus, a glow plug control device for a diesel engine comprises a circuit element or printed circuit board having a plurality of metal-oxide-semiconductor field-effect transistors (MOS-FETs) disposed thereat. At least one electrically conductive element (such as a spring element and such as a plurality of spring elements) has a first end soldered to a first location or node at the circuit element and a second end soldered to a second location or node at the circuit element, and a center region of the at least one electrically conductive element is electrically connected to a power source node or terminal of the glow plug control device. When a temperature or thermal level at the first end of the at least one spring or electrically conductive element reaches a threshold temperature, the solder joint at the first end of the at least one electrically conductive element and the circuit element is broken, while the solder joint at the second end is not broken if the temperature at the second end is below the threshold temperature. However, when a temperature or thermal level at the second end of the at least one spring or electrically conductive element reaches a threshold temperature, the solder joint at the second end of the at least one electrically conductive element and the circuit element is broken.

The center region of the at least one electrically conductive element may be fixedly attached at the power source node, and the first and second ends of the at least one electrically conductive element may be biased away from the circuit element, whereby, when the solder joint is broken at one of the first and second ends, the respective end is urged away from the circuit element so as to not be electrically connected to the circuit element.

These and other objects, advantages, purposes and features of the present invention will become apparent upon review of the following specification in conjunction with the drawings.

DESCRIPTION OF THE PREFERRED EMBODIMENTS

In diesel engine applications having a single fuse, if the main power line becomes broken by one single fuse, then after the fuse is gone, all of the glow plugs are out of function. If that should happen, then the engine may not be startable.

In diesel engine applications where each power line has its own fuse, such an arrangement allows the user to start the engine even though one fuse might be blown since the other cylinders are still heatable. However, more fuses cost more and take up more space.

The present invention provides preloaded springs that function as one time (not reversible) fuses in glow plug controllers. This is achieved by soldering a spring in between two power nodes under tension. In the fail case (of the metal-oxide-semiconductor field-effect transistor or MOS-FET), the soldering area heats up by the own electrical power loss and by the heat that the short cut MOS-FET generates. This works better the nearer the MOS-FET is to the soldering location. As soon as the solder becomes fluid, the spring load pulls the node out of contact, which breaks the current.

In order to save space and costs, the present invention does not have one single tension preloaded spring (-breaker) for each (independently fused) glow plug power node, but instead has one spring contacted with one power node at each end (thus electrically connecting to or contacting multiple power nodes) and also contacted in the middle. Optionally, and desirably, a terminal 30 (power source) may be fed into the middle contact of the spring breaker. In order to achieve substantially constant results, the distance of the MOS FETs to the tension loaded spring power nodes may be equidistant and preferably very close for fast triggering (such as within about 1 minute or less).

Figure 1A:
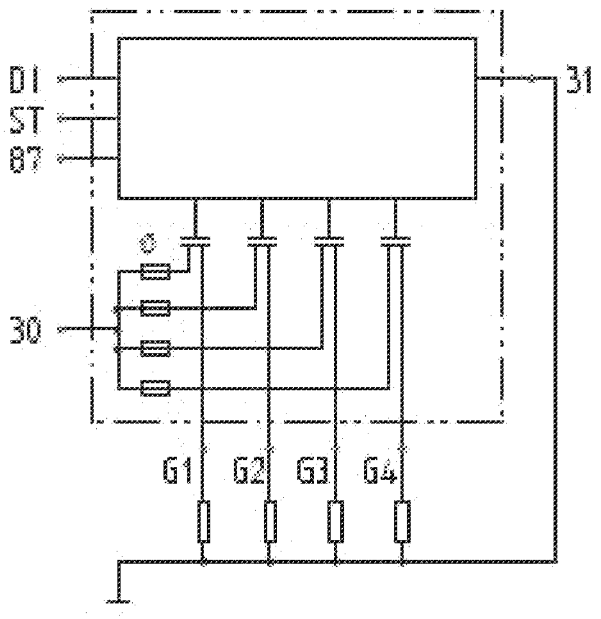
FIG. 1A is an electrical circuit diagram according the present invention, showing an exemplary four cylinder, four glow plug diesel engine with single thermal fuses for each glow plug power path.
Figure 1B:
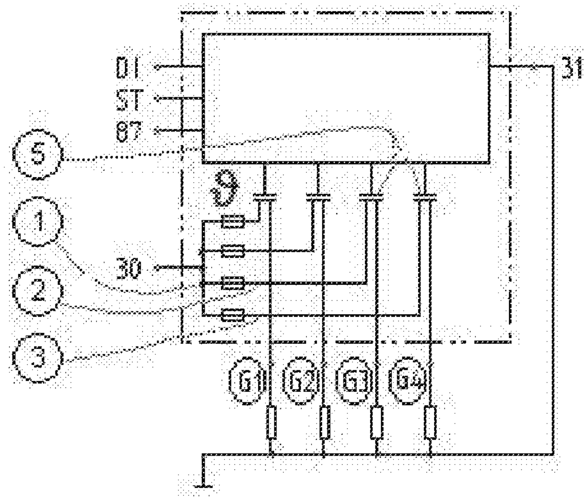
FIG. 1B is an electrical circuit diagram similar to FIG. 1A, having additional markings according the legend below.
Figure 2:
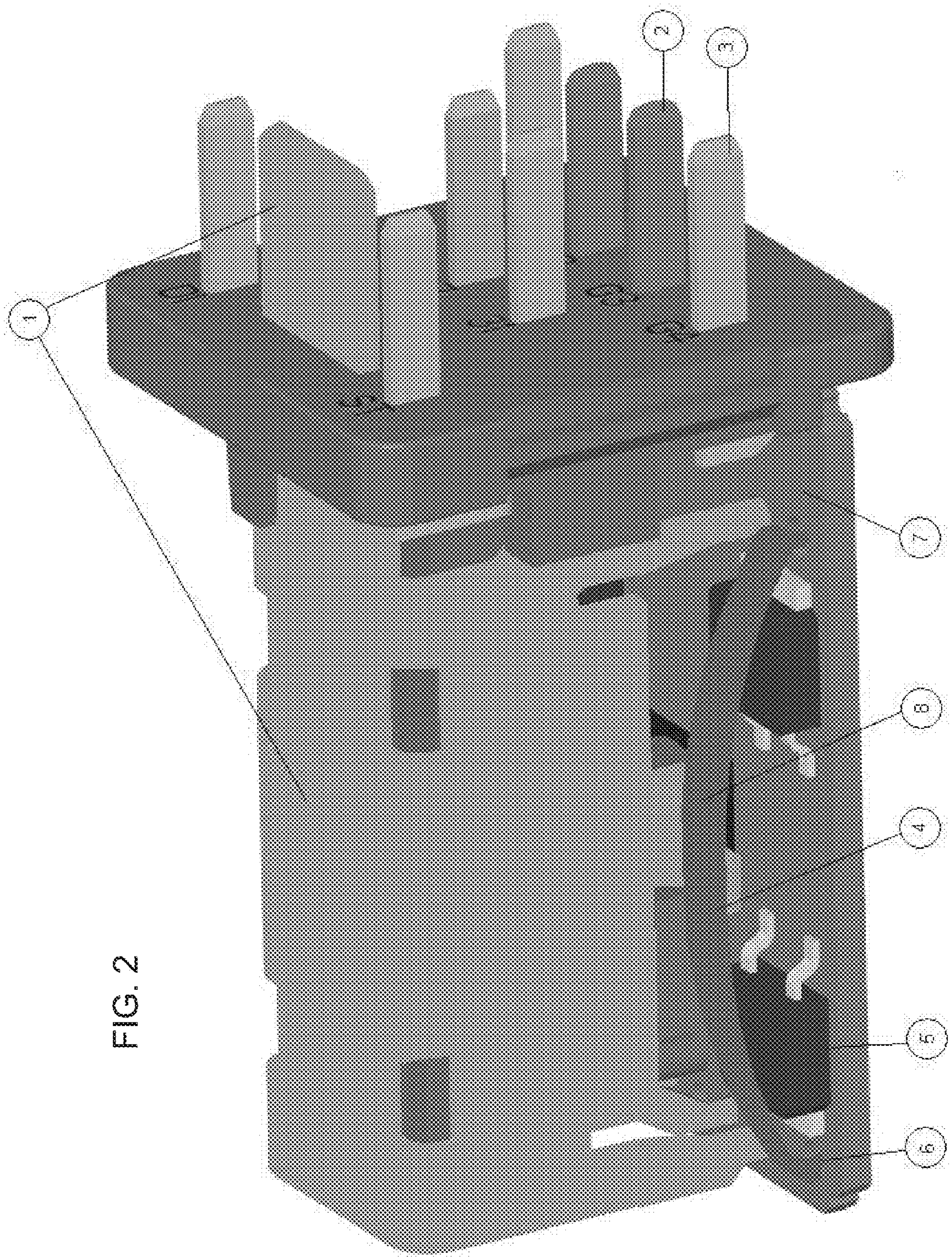
FIG. 2 is a side view of a glow plug control device according the present invention incorporating the circuit of FIGS. 1A and 1B, having springs as a power breaker and with just one spring of the two being visible, and with one spring divided into two independent power breaker contacts, shown with all power breaker contacts closed (before any thermal activation)
Figure 3:
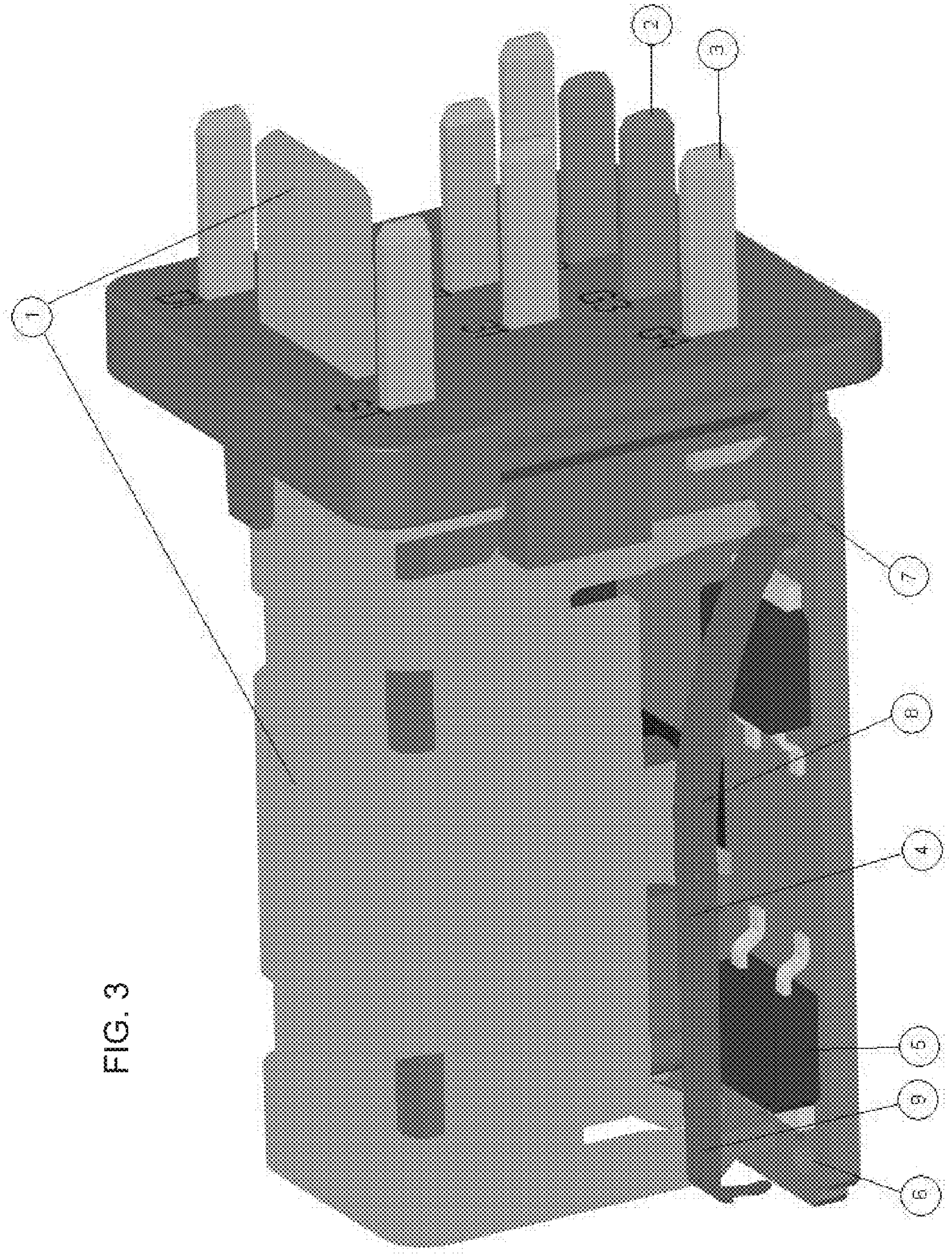
FIG. 3 is a side view of a glow plug control device having springs as a power breaker, shown with one spring divided into two independent power breaker contacts, shown with one power breaker contact (glow plug 3) being open (relaxed spring) after thermal activation.

For example, on a four cylinder diesel engine, there may be just two springs for four glow plugs (such as shown, for example, in FIGS. 1-3). Optionally, for example, on a six cylinder diesel engine, there may be three springs, and optionally, for example, on an eight cylinder diesel engine, there may be four springs, and so on.

LEGEND TO FIGS. 1, 2, 3 AND 4

(1) Power source node (Terminal 30)
(2) Glow plug node 3 (rear left breaker contact)
(3) Glow plug node 4 (front left breaker contact)
(4) power breaker spring contacting terminal 30 in the center
(5) Power MOS-FET for glow plug current control switching
(6) power breaker spring contact hole in the PCB (soldered)
(7) PCB carrying functional components of the glow plug control device
(8) power breaker spring
(9) Relaxed spring end (after thermal breaking)
(G1) Glow plug 1
(G2) Glow plug 2
(G3) Glow plug 3
(G4) Glow plug 4

Figure 4:
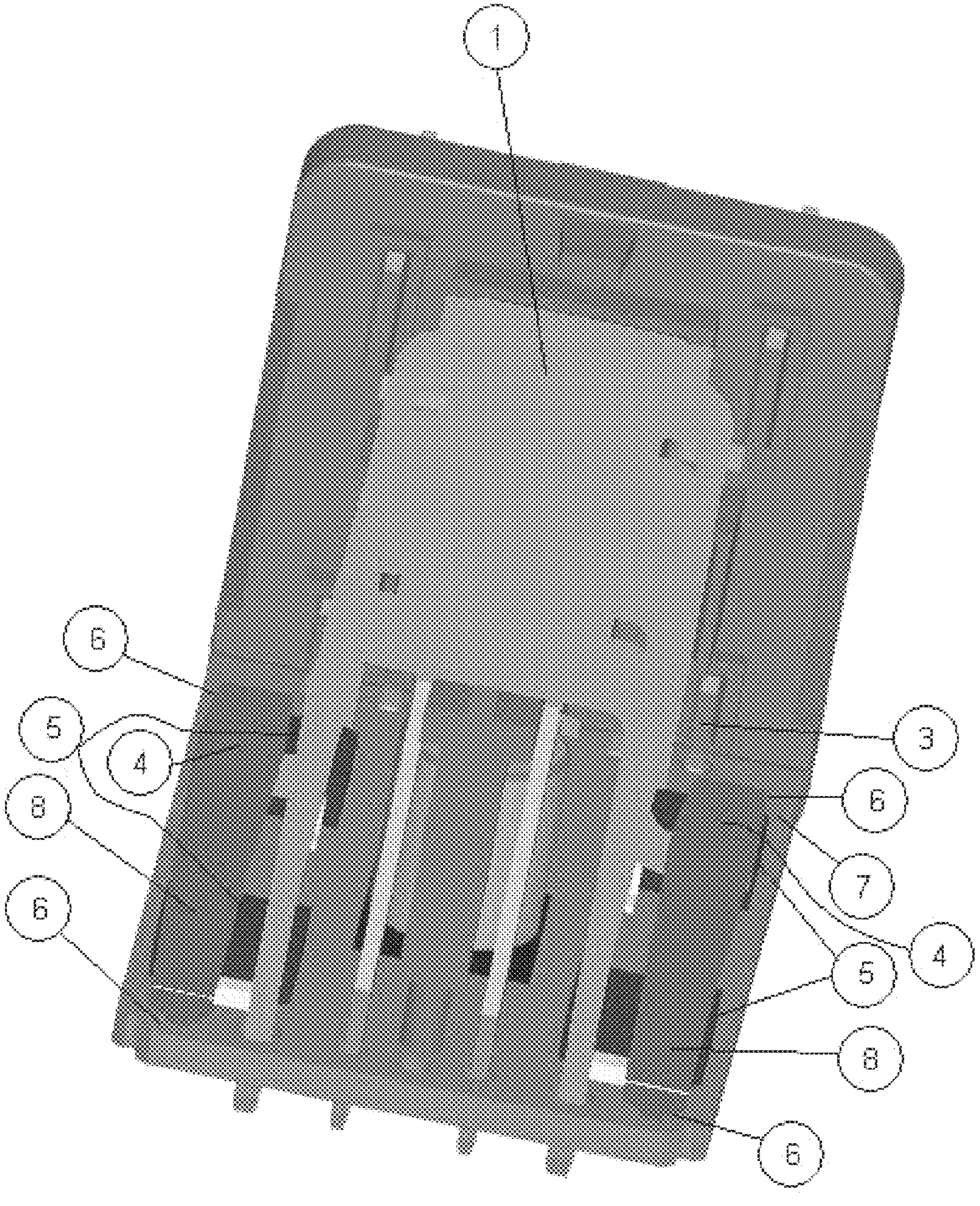
FIG. 4 is a rear view of a glow plug control device according to the present invention, incorporating the circuit of FIGS. 1A and 1B, shown with both springs, having power breaker contacts, being visible, and with all four transistors (such as metal-oxide-semiconductor field-effect transistors or MOS-FETs) being visible.

Thus, and with reference to FIGS. 2-4, a glow plug control device (such as a unitary or modular glow plug control device or unit for controlling or powering a plurality of glow plugs) includes electrically conductive elements or springs 8 as a power breaker (with just one spring of the two springs being visible, but with a second spring (shown in FIG. 4) being arranged along another side or region of the glow plug control device). As shown in FIG. 4, the springs 8 extend along opposite sides of the circuit element 7 (such as a printed circuit board (PCB) or the like), and with four transistors or metal-oxide-semiconductor field-effect transistors or MOS-FETs 5 disposed at respective locations at the circuit element or PCB 7.

As shown in FIG. 2, each spring 8 is divided into two independent power breaker contacts 6, where the ends of the spring 8 are soldered to respective locations at the circuit element 7 and where a center region 4 of the spring is soldered to or electrically connected (such as by partial soldering, by cramping, by crimping, by a beading connection, by riveting, by stacking, by a bayonet like fixation, by welding, by vibration welding, and/or by use of a third element such as a screw or the like) to the power source conductor or node or terminal or element 1 (such as a metal stamping or the like shaped with a portion or tab that protrudes beyond the end wall of the device for connection to the vehicle power source) or alternative fastening via a non-conducting fixation (such as insert molding or such as hot stamping of plastic or the like) having an additional conducting element for attaching the node at the center region. As shown in FIG. 2, the power breaker ends or contacts 6 are closed or in electrical connection (such as via a solder connection or the like) with the circuit board 7 (before any thermal activation).

Although shown and described as having power breaker ends or contacts at the circuit board, the invention may not be limited to have the power breaker contacts 6 on the circuit board 7. Rather, the breaker contacts may be comprised by the pins 2 and 3, for (alternative but not limited) example.

Also, although not shown in FIGS. 2 and 3, the glow plug control device includes a plastic or polymeric housing or casing that encases the power conductor and circuitry therein. The housing encases the metallic power element 1 and may also encase the circuit board, with the end wall being exposed with its terminals protruding therefrom (such as shown in FIGS. 2 and 3) for electrical connection (such as via a plug and socket connection or the like) to the power source and to wiring to the respective glow plugs and the like.

As shown in FIG. 3, the glow plug control device (having springs as a power breaker) may have one spring 8 divided into two independent power breaker contacts (with contacts at the ends 6 and at the middle region 4 of the spring). During operation, when the power terminal or node 1 is connected to a power source, such as 12 volts power source such as the vehicle ignition power source, and when an end region of the spring (that is at or near a respective MOSFET) is heated above a threshold temperature (such as may occur during overheating of a respective transistor), the solder around contact 6 may become fluid (when heated sufficiently so as to melt the solder), and as soon as the solder becomes fluid, the spring load or bias of the spring element pulls the node out of contact with the circuit element (due to the biasing of the spring element towards its initial state or shape), which breaks the current or electrical connection at that end (so that the electrical connection between the end of the spring breaker and the transistor is broken). As shown in FIG. 3, after such thermal activation, one power breaker contact (glow plug 3) may be open (relaxed spring end 9) when the thermal activation is great enough or at a high enough temperature to break the solder bond at the contact, while the other contact of the spring may be closed.

Thus, the glow plug control device may have a power node or connector or element that includes a tab portion or terminal that electrically connects to a vehicle power source (such as 12 volts or vehicle ignition) and, when so connected, provides electrical power to the nodes or terminals at the center region of the spring or springs. The ends of the springs are electrically connected (via respective solder joints) to the glow plug nodes at the printed circuit board, which are electrically connected (such as via conductive traces or the like established at the circuit board) to the transistors, which in turn are electrically connected to the respective glow plugs (G1-G4). Thus, when the transistor at or near or associated with a respective glow plug and a respective spring end heats during operation to an elevated temperature above a threshold level, the respective solder joint melts and the spring end disconnects from the circuit board, thereby deactivating or disconnecting or unpowering the respective transistor and glow plug. As long as the other end or ends of the spring or springs are not so heated, the power to the other transistors and to the other glow plugs controlled by the control device are not disconnected or unpowered, such that the glow plug control device continues to power the other glow plugs even though one of the transistors of the control device has overheated to an elevated temperature above a threshold temperature level.

The spring or breaker may comprise any suitable spring-like or resilient element (such as a flexible element comprising a spring steel or similar electrically conductive material that may flex from an initial state and that returns under spring/resilient action towards its initial state when allowed to so return) that is placed in tension or is biased such that, when the solder (holding its ends at the circuit element or board) melts and releases the respective end of the element, the electrical connection is broken via a spring-like or resilient action so that the end of the element disengages from the electrical connection at the circuit element or board. For example, such a breaker or spring of the glow plug device can utilize spring steel, which typically comprises a low alloy medium carbon steel or a high carbon steel with a high yield strength that allows the breaker, when initially placed in tension or when compressed or bent or formed, such as by bending or the like, to at least partially return to its original untensioned or unbent or uncompressed form when released.

Both spring ends may have single or common activation properties which prevent its (thermal) functionality from activation (thermal activation, current based activation or mechanical activation). This may be beneficial during assembly.

As an alternative embodiment of the present invention, the power breaker spring may comprise a (bi-metal or shape memory alloy) thermal spring (a spring which actively bends or changes shape when its temperature changes), whereby the power breaker ends or nodes are not soldered but are just sticking removably in the contact holes 6 (and providing electrical connection to the circuitry or conductive traces at the circuit board or element). Analogous to the previous solutions, the spring may have a contact area at its first end and a contact area at its second end and its center region may be electrically conductively connected to a third contact area (center node) and mechanically fixed by previously mentioned means. Thus, the spring may electrically connect the center region to the respective circuitry or traces at the circuit board or element when at a temperature below its threshold or activation temperature, and when the temperature at one or both ends of the spring increase above the activation temperature, the spring changes shape and actively bends or reforms to disengage the end or ends from the circuit element. Optionally, both thermal spring ends may possess resettable properties, and they may return to the contacting position when they cool down to below the threshold temperature. Alternatively, both spring ends may possess a resting position which prevents them from returning to the contacting position even when cooled. Both single or in combination may have an activation properties which prevent their thermal functionality before activation (current based activation or mechanical activation).

Figure 5:
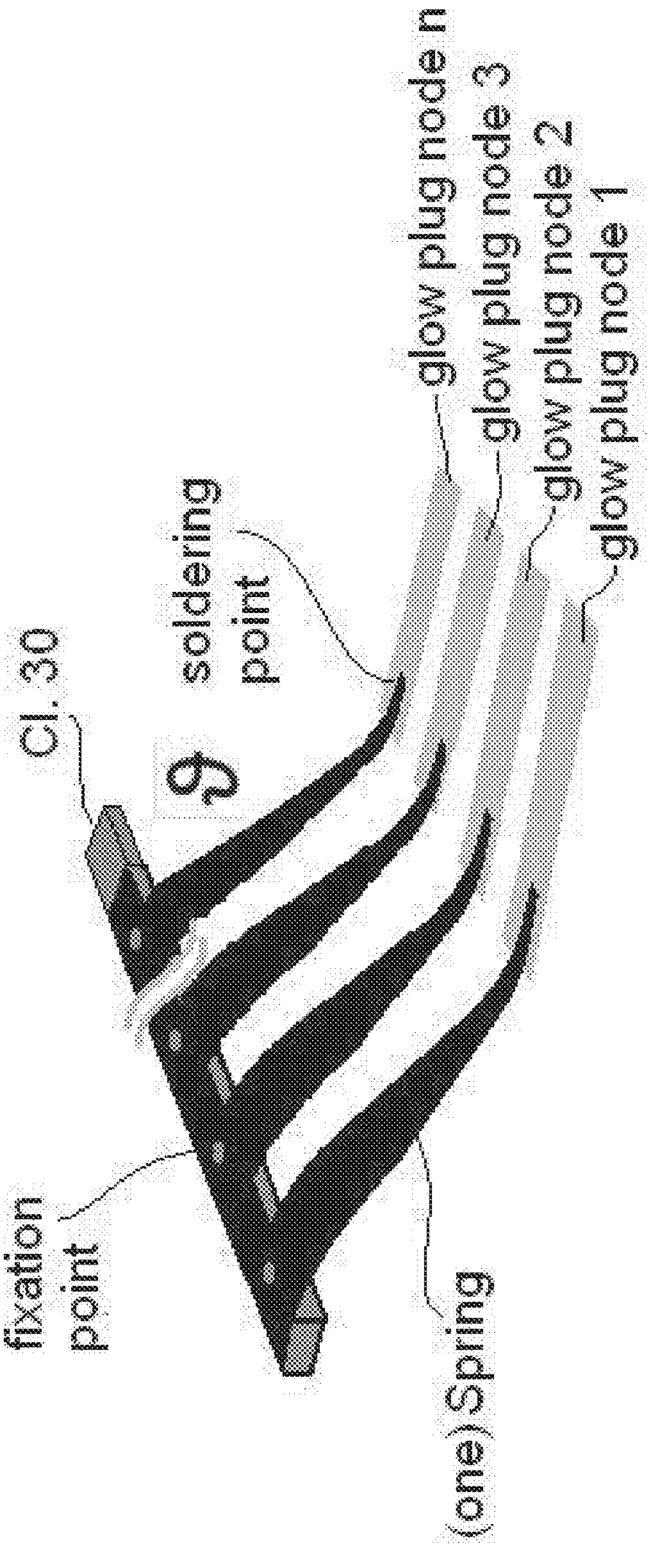
FIG. 5 is a side view of a one piece, n spring node, comp-shape solution of the present invention, showing the power node, the spring element and the glow plug contact nodes alone without the rest of the circuit.
Figure 6:
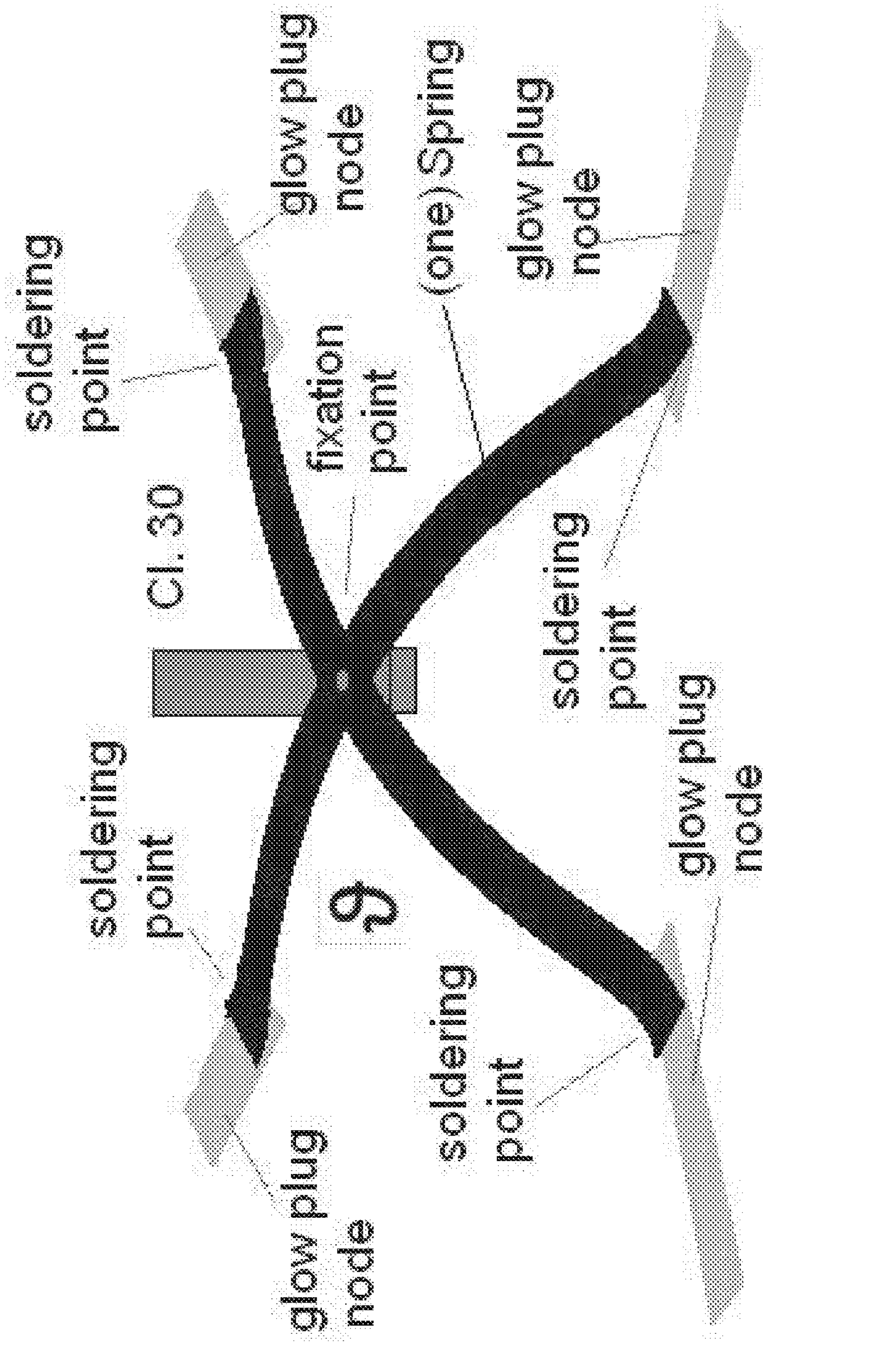
FIG. 6 is a side view of a one piece, four spring node, X-shape solution of the present invention, showing the power node, the spring element and the glow plug contact nodes alone without the rest of the circuit.
Figure 7:
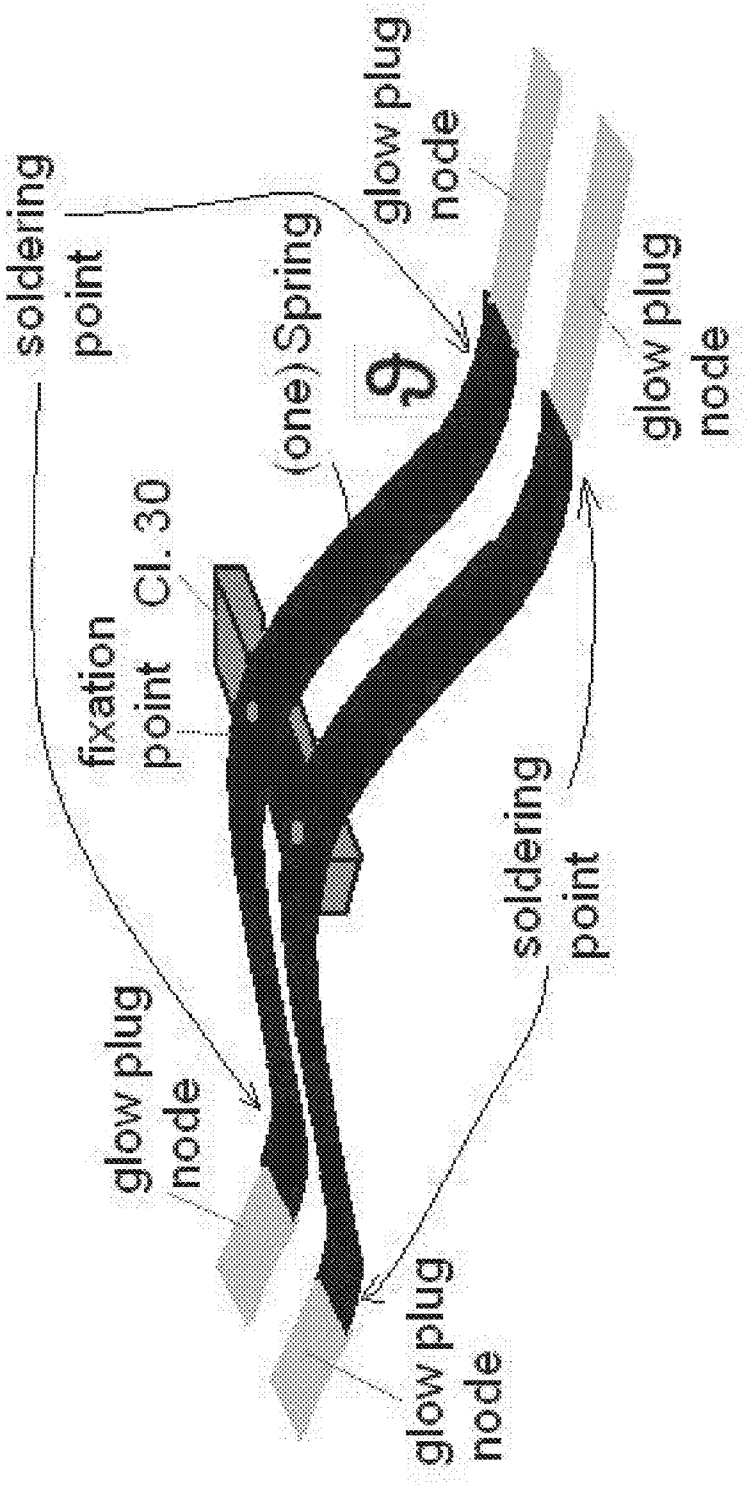
FIG. 7 is a side view of a one piece, four spring node, H-shape solution of the present invention, showing the power node, the spring element and the glow plug contact nodes alone without the rest of the circuit.
Figure 8:
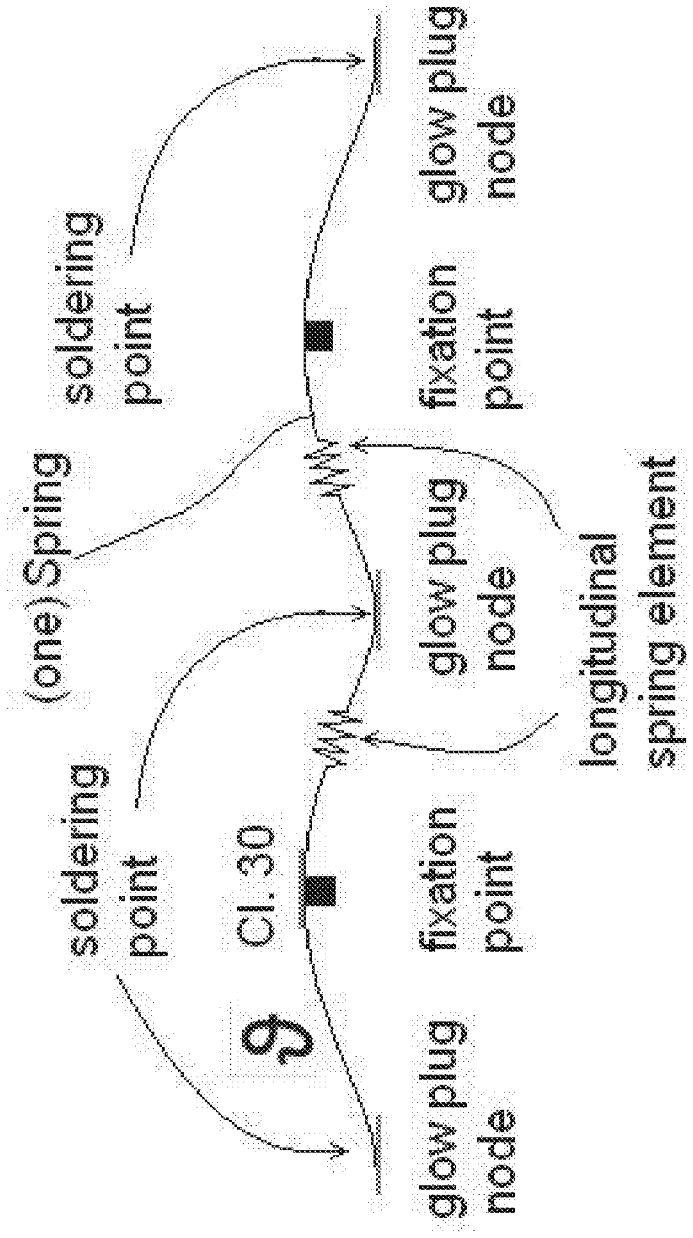
FIG. 8 is a side view of a one piece, string shape solution of the present invention for three glow plugs, showing the power node, the spring element and the glow plug contact nodes alone without the rest of the circuit, with the springs being longitudinally elastic to provide clearance to the spring contact in the center.
Figure 9:
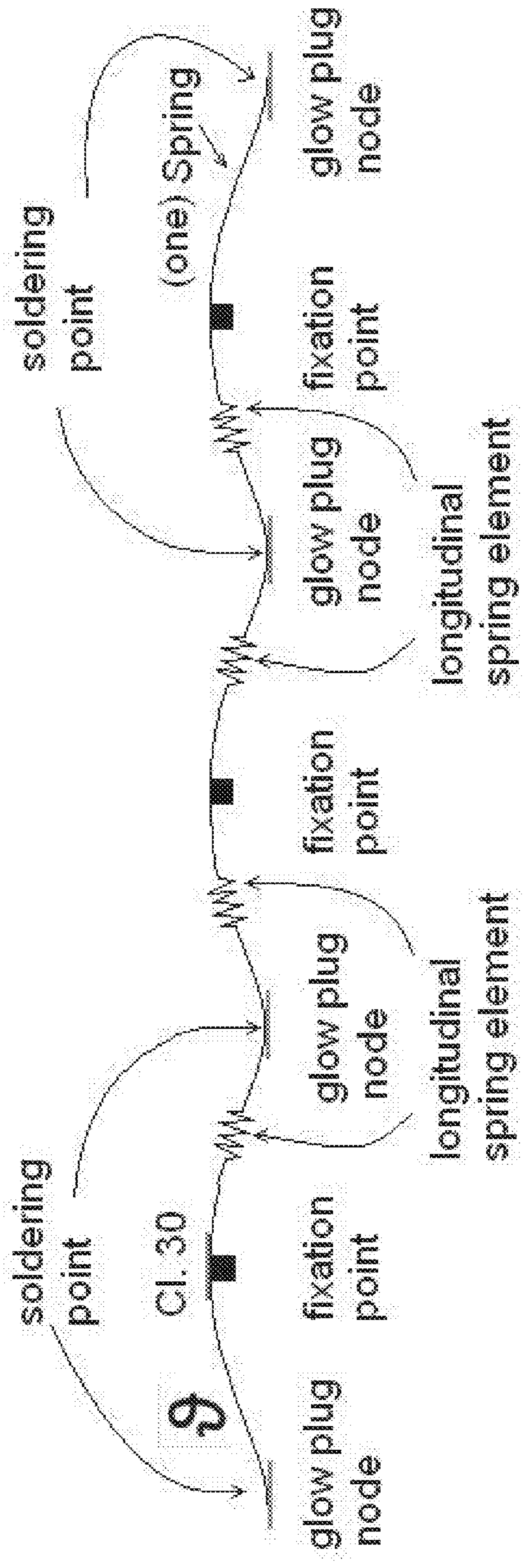
FIG. 9 is a side view of a one piece, string shape solution of the present invention for four glow plugs, showing the power node, the spring element and the glow plug contact nodes alone without the rest of the circuit, with the springs being longitudinally elastic to provide clearance to the spring contacts in the center.

As an alternative to the previous embodiment, one thermal spring element may have not just two glow plug node contacts, but may comprise three or more (n) contacts. The spring contacts may be cut out of one spring (metal) piece in a comb like shape (such as shown in the example of FIG. 5), in an X shape (such as shown in the example of FIG. 6) or an H shape (such as shown in the example of FIG. 7), having fixation points and power node (clamp 30) in or near the center and clearance for the contact detaching movement of the contact spring extensions. Another optional shape may be spring or string like having additional longitudinal elasticity for giving clearance to the spring when it is supposed to move away from the (glow plug-) node when the solder melts (such as shown in the examples of FIGS. 8 and 9).

Thus, the present invention provides glow plug device that has a spring element that is electrically connected between a power source or supply and a plurality of glow plug nodes at or near respective transistors of the glow plug device disposed at a circuit board or element, such as at a printed circuit board of the glow plug device. When any one of the transistors heats above a threshold temperature, the end or portion of the spring element at or near or associated with that transistor is disengaged or disconnected from the circuit board to disconnect power to that transistor (and thus to the respective glow plug), while the other ends or portions of the spring element remain electrically connected to the circuit board at or near (and in electrical connection with) the respective transistors (and thus to the respective glow plugs). Thus, the present invention provides a spring element that maintains electrical connection and power to transistors of the circuit board of the glow plug device unless that particular transistor overheats or heats above a threshold temperature. Thus, the glow plug device will remain substantially operational even if one of the transistors of the glow plug device overheats.

Because a pair of transistors that are associated with a pair of glow plugs are controlled/protected by a single or common spring breaker, the overall package for the control device/module is reduced in size. For example, a glow plug control device for controlling four glow plugs may include two spring breakers, with the four ends of the spring breakers being electrically connected at or to the respective transistors and the center region of each spring breaker being electrically connected to a power terminal. The center regions may be connected to a single or common power terminal (such as shown in FIGS. 6 and 7), or the center regions of the spring breakers may be connected to respective different power terminals (such as shown in FIG. 4). Thus, in accordance with the present invention, the dimensions of the glow plug control device or module can be smaller than what is conventional, and manufacture of the glow plug control device is more economic.

Changes and modifications to the specifically described embodiments may be carried out without departing from the principles of the present invention, which is intended to be limited only by the scope of the appended claims as interpreted according to the principles of patent law.

The invention claimed is:

1. A control device suitable for use in a vehicle, said control device comprising:

an electrically conductive element having a first end in electrical connection with a first solder joint and a second end in electrical connection with a second solder joint;

wherein a center region of said electrically conductive element is in electrical connection with a vehicle power source;

wherein, when a temperature at said first solder joint exceeds a threshold temperature and a temperature at said second solder joint is below the threshold temperature, electrical connection at said first solder joint is broken and electrical connection at said second solder joint is not broken; and wherein said first end is in electrical connection with a first transistor via said first solder joint and said second end is in electrical connection with a second transistor via said second solder joint.

2. The control device of claim 1, wherein said first and second transistors are disposed at a circuit board.

3. The control device of claim 1, wherein said first and second ends of said electrically conductive element are biased away from the respective locations of said first and second solder joints, whereby, when said first solder joint is sufficiently weakened, said first end is urged away from the location of said first solder joint to break electrical connection with said first solder joint.

4. The control device of claim 1, wherein, when a temperature at said second end of said electrically conductive element reaches a threshold temperature, electrical connection at said second solder joint is broken.

5. The control device of claim 1, wherein said control device comprises a glow plug control device for controlling two or more glow plugs of a diesel engine of a vehicle.

6. A control device suitable for use in a vehicle, said control device comprising:

first and second transistors;

an electrically conductive spring breaker having a first end in electrical connection with said first transistor via a first solder joint and a second end in electrical connection with said second transistor via a second solder joint;

wherein a center region of said electrically conductive spring breaker is in electrical connection with a vehicle power source;

wherein, when a temperature at said first transistor at said first end of said electrically conductive spring breaker exceeds a threshold temperature and a temperature at said second transistor at said second end of said electrically conductive spring breaker is below the threshold temperature, electrical connection between said first end of said electrically conductive spring breaker and said first transistor is broken and electrical connection between said second end of said electrically conductive spring breaker and said second transistor is not broken; and wherein said control device comprises a glow plug control device for controlling two or more glow plugs of a diesel engine of a vehicle.

7. The control device of claim 6, wherein said first and second transistors comprise first and second metal-oxide-semiconductor field-effect transistors.

8. The control device of claim 6, wherein said first and second transistors are disposed at a circuit board and wherein said first and second ends of said electrically conductive spring breaker are in electrical connection with circuitry of said circuit board via said first and second solder joints.

9. The control device of claim 8, wherein said electrically conductive spring breaker is biased so that when said first solder joint is broken, said first end of said electrically conductive spring breaker is urged away from said circuit board so as to not be in electrical connection with said circuit board.

10. The control device of claim 6, wherein said electrically conductive spring breaker comprises a metallic spring element.

11. The control device of claim 10, wherein said center region of said electrically conductive spring breaker is fixedly and electrically conductively attached at a power source terminal of said control device.

12. The control device of claim 6, wherein said first and second ends of said electrically conductive spring breaker are biased away from the respective locations of said first and second solder joints, whereby, when said first solder joint is broken at said first end, said first end is urged away from the location of said first solder joint so as to not be in electrical connection with said first transistor.

13. The control device of claim 6, wherein, when a temperature at said second end of said electrically conductive spring breaker reaches a threshold temperature, electrical connection between said second end of said electrically conductive spring breaker and said second transistor is broken.

14. The control device of claim 6, wherein said control device comprises at least two electrically conductive spring breakers, each having first and second ends in electrical connection with respective transistors.

15. The control device of claim 14, wherein said center region of each spring breaker is electrically connected to a common power source terminal of said control device.

16. The control device of claim 14, wherein said center region of each spring breaker is electrically connected to a respective power source terminal of said control device.

17. A control device suitable for use in a vehicle, said control device comprising:

first and second transistors, wherein said first and second transistors comprise first and second metal-oxide-semiconductor field-effect transistors;

an electrically conductive spring breaker having a first end in electrical connection with said first transistor via a first solder joint and a second end in electrical connection with said second transistor via a second solder joint;

wherein said electrically conductive spring breaker comprises a metallic spring element;

wherein a center region of said electrically conductive spring breaker is in electrical connection with a vehicle power source;

wherein, when a temperature at said first transistor at said first end of said electrically conductive spring breaker exceeds a threshold temperature and a temperature at said second transistor at said second end of said electrically conductive spring breaker is below the threshold temperature, electrical connection between said first end of said electrically conductive spring breaker and said first transistor is broken and electrical connection between said second end of said electrically conductive spring breaker and said second transistor is not broken; and wherein said control device comprises a glow plug control device for controlling two or more glow plugs of a diesel engine of a vehicle.

18. The control device of claim 17, wherein said first and second ends of said electrically conductive spring breaker are biased away from the respective locations of said first and second solder joints, whereby, when said first solder joint is broken at said first end, said first end is urged away from the location of said first solder joint so as to not be in electrical connection with said first transistor.

19. The control device of claim 17, wherein, when a temperature at said second end of said electrically conductive spring breaker reaches a threshold temperature, electrical connection between said second end of said electrically conductive spring breaker and said second transistor is broken.

* * * * *